(12) United States Patent
Astvatsaturov et al.

(10) Patent No.: US 12,506,946 B2
(45) Date of Patent: Dec. 23, 2025

(54) MACHINE VISION DEVICE WITH SWITCHABLE DIRECT AND DIFFUSED ILLUMINATION

(71) Applicant: ZEBRA TECHNOLOGIES CORPORATION, Lincolnshire, IL (US)

(72) Inventors: Yuri Astvatsaturov, Lake Forest, IL (US); Darran Michael Handshaw, Sound Beach, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 180 days.

(21) Appl. No.: 18/204,255

(22) Filed: May 31, 2023

(65) Prior Publication Data
US 2024/0406532 A1 Dec. 5, 2024

(51) Int. Cl.
*H04N 23/56* (2023.01)
*G02F 1/1362* (2006.01)
*G02F 1/1514* (2019.01)
*H04N 23/611* (2023.01)
*G06K 1/12* (2006.01)

(52) U.S. Cl.
CPC ....... *H04N 23/56* (2023.01); *G02F 1/136209* (2013.01); *G02F 1/1514* (2019.01); *H04N 23/611* (2023.01); *G06K 1/12* (2013.01)

(58) Field of Classification Search
CPC ...... H04N 23/56; H04N 23/611; H04N 23/55; G02F 1/136209; G02F 1/1514; G06K 1/12; G06K 7/10732; G06K 7/10831
See application file for complete search history.

(56) References Cited

U.S. PATENT DOCUMENTS

| | | | |
|---|---|---|---|
| 12,060,991 B1 * | 8/2024 | Murthy | F21V 7/06 |
| 2011/0024506 A1 | 2/2011 | Nunnink | |
| 2013/0154514 A1 | 6/2013 | Liaw | |
| 2017/0367124 A1 * | 12/2017 | Bhella | H04W 12/50 |
| 2020/0167982 A1 | 5/2020 | Armstrong-Muntner | |
| 2021/0191233 A1 | 6/2021 | Coughenour et al. | |
| 2021/0312151 A1 * | 10/2021 | Scherly | G06T 7/73 |
| 2023/0401403 A1 * | 12/2023 | Stefanini | G06K 7/10831 |

OTHER PUBLICATIONS

International Search Report and Written Opinion for International Patent Application No. PCT/US2024/26514 mailed on Sep. 19, 2024.

* cited by examiner

*Primary Examiner* — Shahbaz Nazrul
(74) *Attorney, Agent, or Firm* — Yuri Astvatsaturov

(57) ABSTRACT

Machine vision devices and systems with automatically switchable direct and diffused illumination are provided herein. An example includes a machine vision system, comprising an image capture device, a material with switchable optical properties, wherein the material with switchable optical properties has a transparent state and a translucent state, and a light source, wherein the light source is positioned to illuminate a target of the image capture device, and the material with switchable optical properties is positioned between the light source and the target of the image capture device and configured to switch between the transparent state which is configured to provide direct illumination of the target and the translucent state which is configured to provide diffused illumination of the target.

13 Claims, 8 Drawing Sheets

MACHINE VISION DEVICE WITH SWITCHABLE DIRECT AND DIFFUSED ILLUMINATION

BACKGROUND

When imaging items in a machine vision setting, many disparate properties and conditions may be encountered by a single device. For this reason, many machine vision devices require solutions to illuminate a target object that may be required to provide a wide range of illumination options. A highly reflective object, for example, may require diffused illumination so as not to saturate an image, while the same diffused illumination may be insufficient in poor lighting conditions or for a light-absorbent object.

SUMMARY

Machine vision devices and systems with automatically switchable direct and diffused illumination are provided herein. In an example embodiment, a machine vision system comprises an image capture device, a material with switchable optical properties, wherein the material with switchable optical properties has a transparent state and a translucent state, and a light source, wherein the light source is positioned to illuminate a target of the image capture device, and the material with switchable optical properties is positioned between the light source and the target of the image capture device and configured to switch between the transparent state which is configured to provide direct illumination of the target and the translucent state which is configured to provide diffused illumination of the target.

In a variation of this example embodiment, the machine vision system further comprises a window that includes the material with switchable optical properties.

In a variation of this example embodiment, the window is positioned between the image capture device and the target of the image capture device.

In a variation of this example embodiment, the window is positioned between an aiming assembly and the target of the image capture device.

In a variation of this example embodiment, only a portion of the window includes the material with switchable optical properties.

In a variation of this example embodiment, the material with switchable optical properties contains at least one of an electrochromic material, a polymer dispersed liquid crystal material, and a suspended particle material.

In a variation of this example embodiment, the system is configured to change the state of the material with switchable optical properties responsive to a predetermined condition being met.

In a variation of this example embodiment, the predetermined condition is a determination that at least one of a specularity of the target of the image capture device, a saturation of an image, a saturation of a portion of an image exceeds a predetermined threshold.

In a variation of this example embodiment, the predetermined condition is a determination that a human face has entered a field of view of the image capture device.

In a variation of this example embodiment, the predetermined condition is a determination that the target of the image capture device is a subject of direct part marking (DPM).

In a variation of this example embodiment, the predetermined condition is a determination that the machine vision system is in an indicia-non-reading state.

In a variation of this example embodiment, the system is configured to change the state of the material with switchable optical properties periodically at a predetermined frequency.

In a variation of this example embodiment, the predetermined frequency is greater than 45 hertz.

In a variation of this example embodiment, the predetermined frequency is configured to operate synchronously with an image capture frequency of the image capture device.

In a variation of this example embodiment, the machine vision system is part of an indicia decoding device.

In another example embodiment, an indicia decoding device comprises an image capture device, a material with switchable optical properties, wherein the material with switchable optical properties has a transparent state and a translucent state, an aiming assembly, and a light source, wherein the light source is positioned to illuminate a target of the image capture device, and the material with switchable optical properties is positioned between the light source and the target of the image capture device and configured to switch between the transparent state which is configured to provide direct illumination of the target and the translucent state which is configured to provide diffused illumination of the target.

In a variation of this example embodiment, the indicia decoding device further comprises a window, and the window includes the material with switchable optical properties.

In a variation of this example embodiment, only a portion of the window includes the material with switchable optical properties.

In a variation of this example embodiment, the device is configured to change the state of the material with switchable optical properties responsive to a predetermined condition being met.

In yet another example embodiment, an indicia reader comprises a housing, an imaging assembly positioned at least partially within the housing and having a field of view (FOV), an illumination assembly positioned at least partially within the housing and configured to provide illumination along an illumination path and over at least a portion of the FOV, and a switchable diffusion assembly positioned within the illumination path, the switchable diffusion assembly having an optical element that is switchable between at least a transparent state and a translucent state, wherein the indicia reader is alternately operable in one of a first reader state and a second reader state, when the indicia reader is operable in the first reader state, the imaging assembly is activated to capture image data over a first exposure period with the illumination assembly activated and the optical element in the transparent state for at least some portion of the exposure period, and when the indicia reader is operable in the second reader state, the imaging assembly is activated to capture image data over a second exposure period with the illumination assembly activated and the optical element in the translucent state for at least some portion of the second exposure period.

In a variation of this example embodiment, the indicia reader further comprises a window positioned within an aperture of the housing, and the window includes the optical element.

In a variation of this example embodiment, the imaging assembly is configured to capture image frames at a framerate that is equal to or greater than 90 frames per second, and the indicia reader sequentially alternates between the first reader state and the second reader state during an indicia-reading session.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed systems and devices, and explain various principles and advantages of those embodiments.

Figure 1:
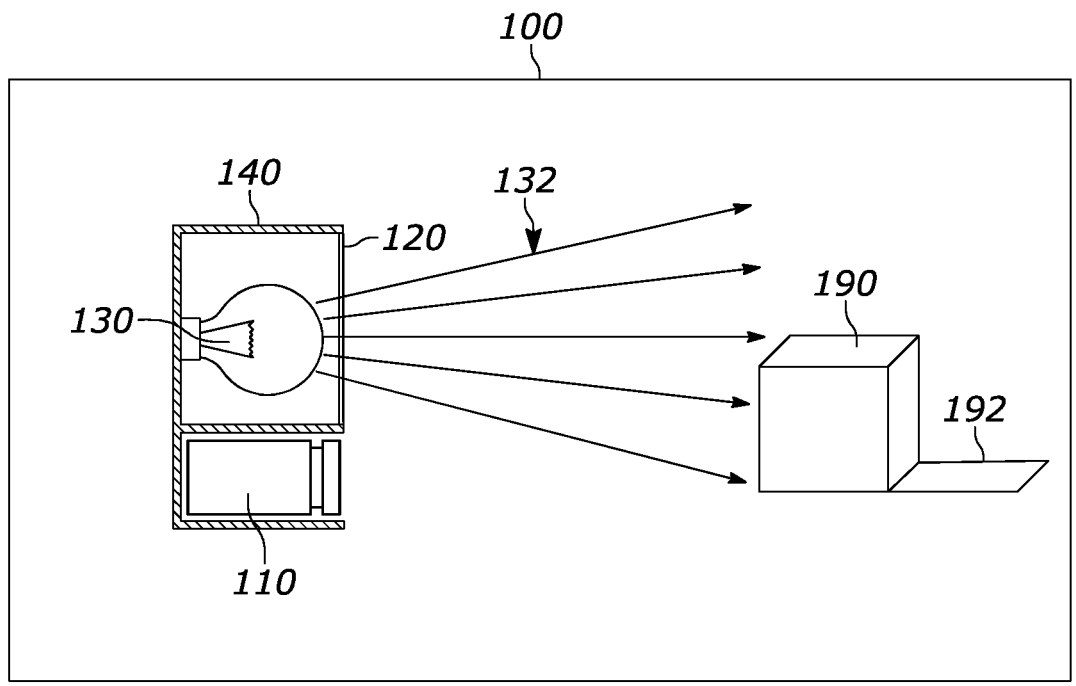
FIG. 1 illustrates an example illumination system in a direct lighting state, according to example embodiments of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Systems and devices are disclosed herein for automatically switching between direct and diffused lighting states in machine vision environments. Machine vision systems often require a wide range of lighting conditions to operate effectively. Existing systems typically provide separate lighting assemblies for providing direct lighting and diffuse lighting, which can be bulky and expensive. It is therefore desirable to implement a simplified lighting system that can be configured to provide appropriate lighting conditions that an associated machine vision system may require.

FIG. 1 illustrates an example illumination system 100 in a direct lighting state, according to example embodiments of the present disclosure. The system 100 comprises an image capture device 110, a material with switchable optical properties 120 (switchable material 120) that is positioned between a light source 130 and a target 190 of the system 100, and a housing 140 that encloses the light source 130 and the image capture device 110. The system 100 is in the direct lighting state, and a plurality of light rays 132 are emanating from the light source 130 through the switchable material 120 to illustrate this. Additionally, the target 190 casts a shadow 192 to further accentuate the nature of the direct lighting state. Lenses or apertures may be included to focus or direct the plurality of light rays 132.

When the system 100 is in operation, the light source 130 casts a plurality of light rays 132 outwards through the switchable material 120 to illuminate the target 190. The image capture device 110 then captures one or more images of the target 190. While the switchable material 120 is in a transparent state in this illustration in order to provide direct illumination of the target 190, the switchable material 120 is also capable of operating in a translucent state to provide diffused illumination of the target 190 (see FIG. 2). A decision to switch between the transparent state and the translucent state may be based upon data from the image capture device 110, data from range detecting sub-systems, data from additional sensors aimed at the target object such as but not limited to photodiodes, data from other sources such as but not limited to a user selectable setting, or may be predetermined (see FIG. 4, FIG. 5, FIG. 6, FIG. 7). For example, the system 100 may be configured to capture an image of the target 190 with direct illumination followed by diffused illumination (or vice versa) regardless of a quality of a first image.

The switchable material 120 may be any material which can be made to transition between the transparent state and the translucent state in response to commands from a controller of the system 100 including but not limited to electrochromic materials, suspended particle devices, liquid crystal materials such as but not limited to polymer dispersed liquid crystal (PDLC), translucent materials which can be mechanically positioned between the light source 130 and the target 190, or combinations thereof. The controller may be a processing device, a microcontroller, an application running on a non-dedicated computing system, or any other means of controlling the system 100. The switchable material 120 may have a plurality of states in between the transparent state and the translucent state in which various degrees of light diffusion may be provided. The switchable material 120 may be configured to rapidly change between the transparent state and the translucent stat (see FIG. 8). The switchable material 120 may be integrated into a sheet of glass, may be a switchable film applied to one side of a sheet of glass, may be a switchable film sandwiched between two sheets of transparent material (i.e. glass, acrylic, etc.), take any other form, or combinations thereof.

The light source 130 may be any device which can produce light including but not limited to one or more incandescent devices, one or more fluorescent lamps, one or more lasers, one or more halogen lamps, one or more light emitting diodes (LEDs), devices that produce light via combustion, or combinations thereof. The light source 130 may be configured to emit light continuously or to emit a pulse of light when the image capture device 110 is capturing an image of the target 190. The image capture device 110 can be any device capable of capturing an image of the target 190. For example, the image capture device 110 may be a machine vision device such as an indicia reader.

Figure 2:
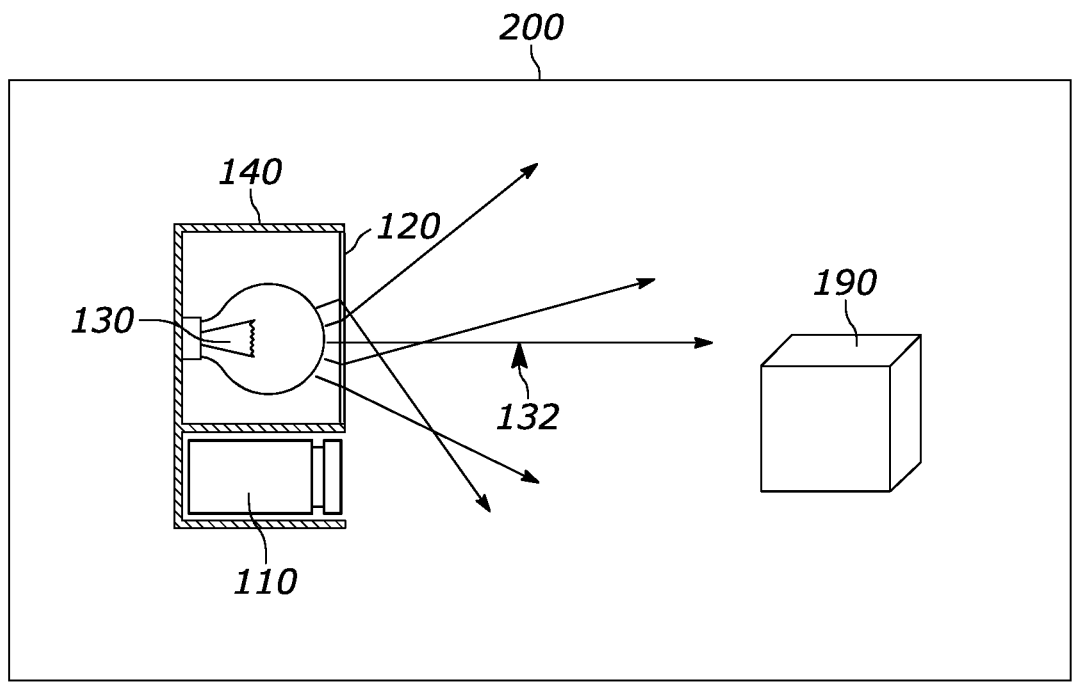
FIG. 2 illustrates an example illumination system in a diffused lighting state, according to example embodiments of the present disclosure.

FIG. 2 illustrates an example illumination system 200 in a diffused lighting state, according to example embodiments of the present disclosure. The system 200 comprises an image capture device 110, a material with switchable optical properties 120 (switchable material 120) that is positioned between a light source 130 and a target 190 of the system 200, and a housing 140 that encloses the light source 130 and the image capture device 110. The system 200 is in the diffused lighting state, and a plurality of light rays 132 are emanating from the light source 130 through the switchable material 120. The light rays 132 are shown to scatter as they pass through the switchable material 120 to illustrate the diffused lighting state, however it will be appreciated that the light rays 132 passing through the switchable material 120 may take paths that significantly differ from what is illustrated herein, and that particular paths of illustrated light rays 132 are for example purposes only.

When the system 200 is in operation, the light source 130 casts a plurality of light rays 132 outwards through the switchable material 120 to illuminate the target 190. The image capture device 110 then captures one or more images of the target 190. While the switchable material 120 is in a translucent state in this illustration in order to provide diffused illumination of the target 190, the switchable material 120 is also capable of operating in a transparent state to provide direct illumination of the target 190 (see FIG. 1). A decision to switch between the transparent state and the translucent state may be based upon data from the image capture device 110, data from additional sensors not illustrated herein, data from other sources not discussed herein, or may be predetermined (see FIG. 4, FIG. 5, FIG. 6, FIG. 7). For example, the system 200 may be configured to capture an image of the target 190 with direct illumination followed by diffused illumination (or vice versa) regardless of a quality of a first image.

The system 200 may be capable of producing multiple diffused lighting states with varying degrees of light diffusion. In such an embodiment, a particular diffused lighting state may be chosen based upon data from the image capture device 110, data from additional sensors not illustrated herein, data from other sources not discussed herein, or may be predetermined (see FIG. 4, FIG. 5, FIG. 6, FIG. 7). The system 200 may be configured to allow a user to manually select a lighting state.

Figure 3:
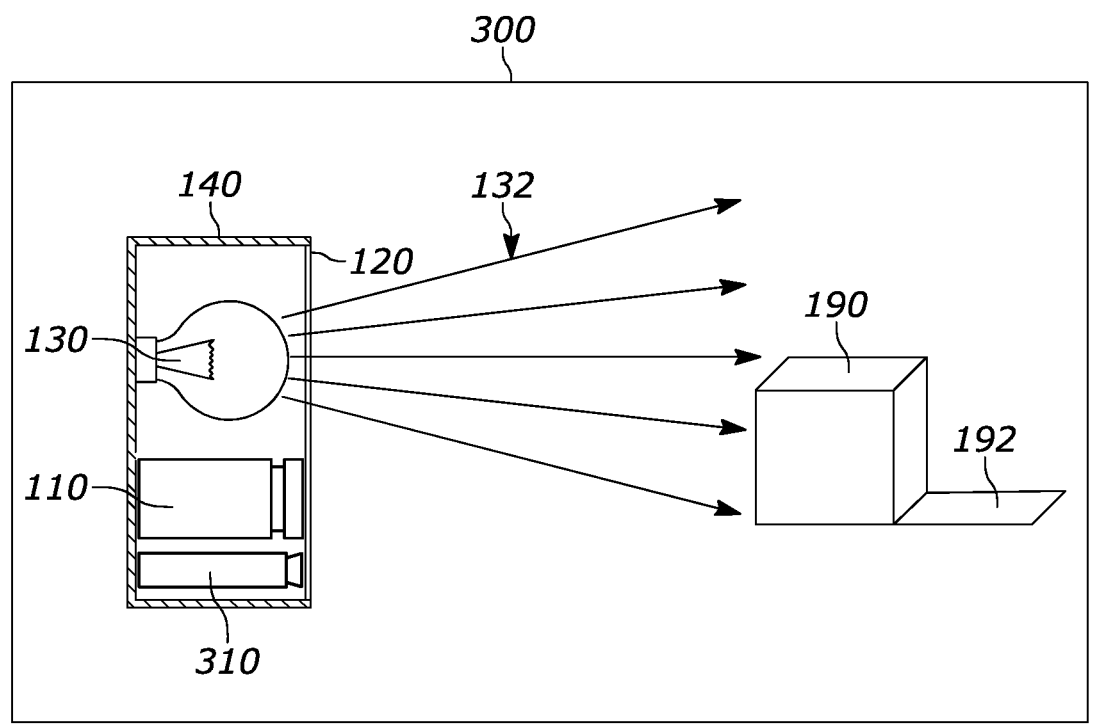
FIG. 3 illustrates an example illumination system that includes a window, according to example embodiments of the present disclosure.

FIG. 3 illustrates an example illumination system 300 that includes a window, according to example embodiments of the present disclosure. The system 300 comprises an image capture device 110, and aiming assembly 310, a window that includes a material with switchable optical properties 120 (window of switchable material 120) that is positioned between a light source 130, the image capture device 110, and the aiming assembly 310 and a target 190 of the system 300, and a housing 140 that encloses the light source 130, the aiming assembly 310, and the image capture device 110. The system 300 is in the direct lighting state, and a plurality of light rays 132 are emanating from the light source 130 through the window of switchable material 120. A shadow 192 is illustrated as being cast by the target 190 to illustrate and emphasize the direct lighting state.

In this example scenario, the window of switchable material 120 is positioned between the target 190 and the light source 130, the image capture device 110, and the aiming assembly 310. This configuration allows the window of switchable material 120 to obscure the aiming assembly 310 when the system 300 is not capturing an image of the target 190, but may impair an ability of the system 300 to capture images of the target 190 with diffused lighting. This issue can be mitigated by splitting the window of switchable material 120 into two or more sections which may be independently switched between a transparent state and a translucent state (see FIG. 4, FIG. 5, and FIG. 6). The window of switchable material 120 may be switched rapidly to coincide with image captures of the image capture device 110. For example, when the image capture device 110 operates at a frame rate of 45 images captured per second, the window of switchable material 120 may be configured to switch from translucent to transparent and back to translucent 45 times per second, executing one translucent-to-transparent-to-translucent cycle each time the image capture device 110 captures an image of the target 190. In this way, the image capture device 110 and aiming assembly 310 may be kept less visible or invisible to a human user observing operation of the system 300, maintaining a cleaner overall appearance.

The aiming assembly 310 may be a laser projector such as those found commonly in indicia scanning devices. The aiming assembly 310 may alternatively be any device which assists the image capture device 110 in extracting visual data from the target 190. In some scenarios, the window of switchable material 120 may be located between the target 190 and one of the image capture device 110 or the aiming assembly 310, and not the other. In some scenarios, each of the aiming assembly 310, the image capture device 110, and the light source 130 may each have an associated portion of the window of switchable material 120 which can be independently switched between the transparent state and the translucent state. In such a scenario, each portion of the window of switchable material 120 may be configured to transition from the translucent state to the transparent state or vice versa responsive to a current activity of an associated element. For example, a portion of the window of switchable material 120 may be configured to switch from translucent to translucent when the aiming assembly 310 projects a laser onto the target 190, then switch back to translucent once the aiming assembly 310 stops projecting the laser.

Figure 4:
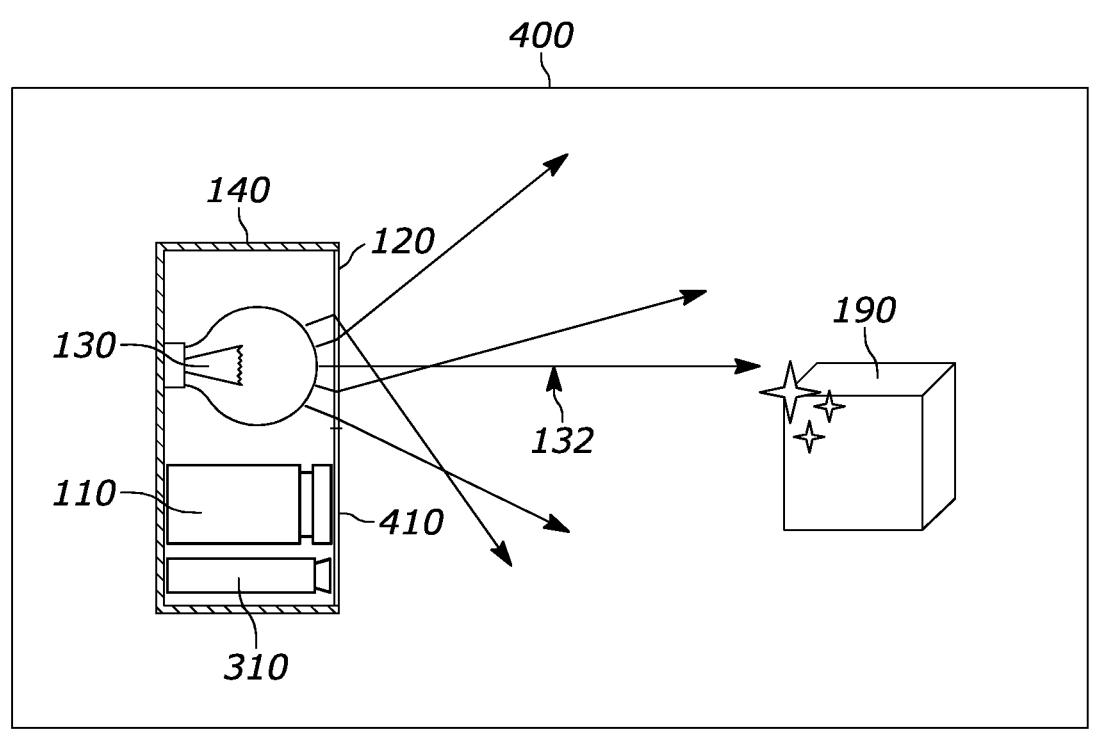
FIG. 4 illustrates an example illumination system that includes a window where only a portion of the window includes a material with switchable optical properties, according to example embodiments of the present disclosure.

FIG. 4 illustrates an example illumination system 400 that includes a window where only a portion of the window includes a material with switchable optical properties, according to example embodiments of the present disclosure. The system 400 comprises an image capture device 110, and aiming assembly 310, a window with a portion that includes a material with switchable optical properties 120 (switchable portion 120) and a portion that does not include a material with switchable optical properties 410 (non-switchable portion 410). The window is positioned between a light source 130, the image capture device 110, and the aiming assembly 310 and a target 190 of the system 400. A housing 140 encloses the light source 130, the aiming assembly 310, and the image capture device 110. The system 400 is in the diffused lighting state, and a plurality of light rays 132 are emanating from the light source 130 through the switchable portion 120 and being refracted in various directions (see FIG. 2). The target 190 is illustrated with several features to illustrate that the target 190 is highly specular, reflecting large amounts of light back at the system 400.

In this example scenario, the system 400 is operating in the diffused lighting state because the target 190 is highly specular. Highly specular objects may return large quantities of light to the system 400 which may interfere with an ability of the image capture device 110 to capture images of a necessary quality for the system 400 to function as intended. It may therefore be desirable to configure the system 400 to switch into the diffused lighting state when it detects a target 190 that is highly specular. This may be achieved by detecting a high level of saturation in an image captured by the image capture device 110. The detected high level of saturation may be present in a portion of the image, and this situation the system 400 may be configured to switch lighting states responsive to detecting such a partial saturation condition.

Also in this example scenario, the switchable portion 120 of the window may operate as described in FIG. 1, FIG. 2, and FIG. 3. The non-switchable portion 410 may be permanently transparent so as to allow the image capture device 110 and aiming assembly 310 to always view the target 190. Alternatively, the non-switchable portion 410 may be replaced by an independently switchable portion of the window (see FIG. 3) which can obscure the image capture device 110 and the aiming assembly 310 the image capture device 110 and the aiming assembly 310 are not in use. A bulkhead (not illustrated) may be provided between the light source 130 and other components within the housing 140 to contain light emitted by the light source 310 to an area that is bounded by the housing 140 and the bulkhead, with the switchable portion 120 of the window being the sole route for the light rays 132 to escape.

Figure 5:
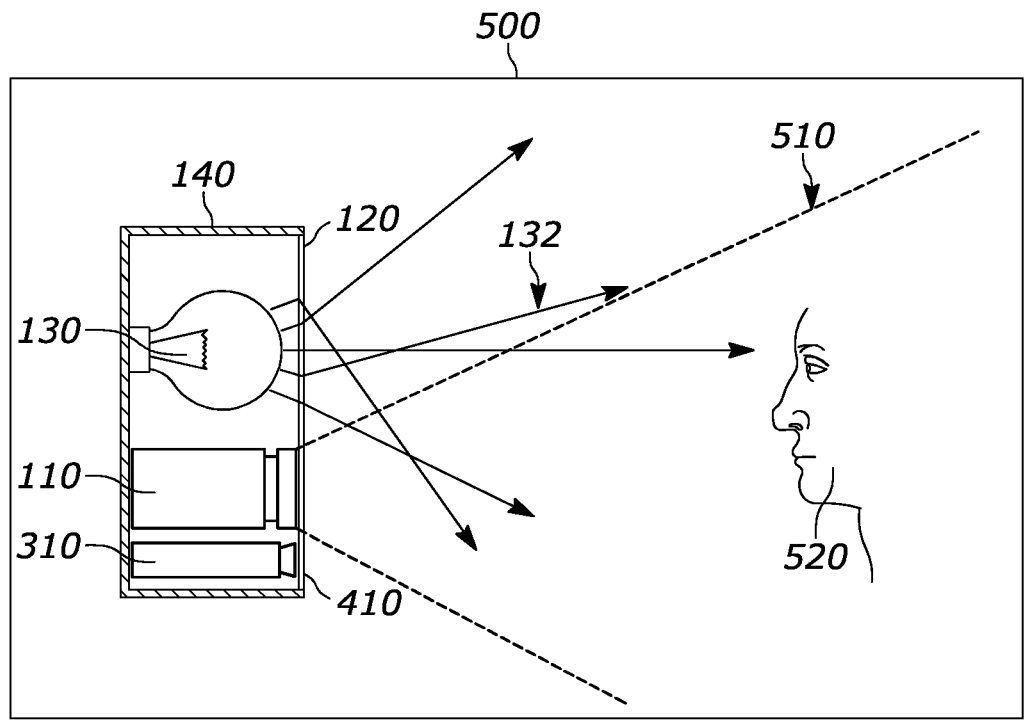
FIG. 5 illustrates an example illumination system in a diffused lighting state responsive to detecting a human face in a field of view, according to example embodiments of the present disclosure.

FIG. 5 illustrates an example illumination system 500 in a diffused lighting state responsive to detecting a human face 520 in a field of view 510, according to example embodiments of the present disclosure. The system 500 comprises an image capture device 110, and aiming assembly 310, a window with a first portion that includes a material with switchable optical properties 120 (first portion 120) and a second portion that includes a material with switchable optical properties 410 (second portion 410). The window is positioned between a light source 130, the image capture device 110, and the aiming assembly 310 and a target 190 of the system 500. A housing 140 encloses the light source 130, the aiming assembly 310, and the image capture device 110. The system 500 is in the diffused lighting state, and a plurality of light rays 132 are emanating from the light source 130 through the first portion 120 and being refracted in various directions (see FIG. 2). The image capture device 110 has a field of view 510, within which is a human face 520.

In this example scenario, the system 500 is operating in the diffused lighting state because the system 500 has detected the human face 520 within the field of view 510 of the image capture device 110. Direct lighting of the human face 520 may cause discomfort for a human user, and in extreme cases may pose a health hazard. It may therefore be desirable to configure the system 500 to automatically switch to the diffused lighting state upon detecting the human face 520. Detection of the human face 520 may be achieved by any means, including but not limited to pattern recognition, machine learning, methods not disclosed herein, and combinations thereof.

In some example embodiments, the material with switchable optical properties may be capable of providing several intermediate states between transparent and translucent. For example, the first portion 120 may be configured to switch to a 50% translucent state responsive to detecting the human face 520 if a 100% translucent state provides insufficient lighting of a target. The first portion 120 and the second portion 410 may be capable of providing a wide range of possible states, ranging from 0% translucent (fully direct) lighting to 100% translucent (fully diffused) lighting.

Also in this example scenario, the first portion 120 and the second portion 410 of the window are configured to be independently switchable between transparent and translucent (and vice versa). This allows the first portion 120 which is positioned between the light source 130 and the human face 520 to maintain the diffused lighting state by operating in a translucent state while the second portion 410 is transparent, allowing the image capture device 110 to continue capturing and analyzing images of the target 190 (see FIG. 1, FIG. 2, FIG. 3, FIG. 4, FIG. 6, and FIG. 7) or the human face 520. By continuing to capture and analyze images, the system 500 may be configured to switch back into a direct lighting state when the system 500 no longer detects the human face 520 in the field of view 510.

Figure 6:
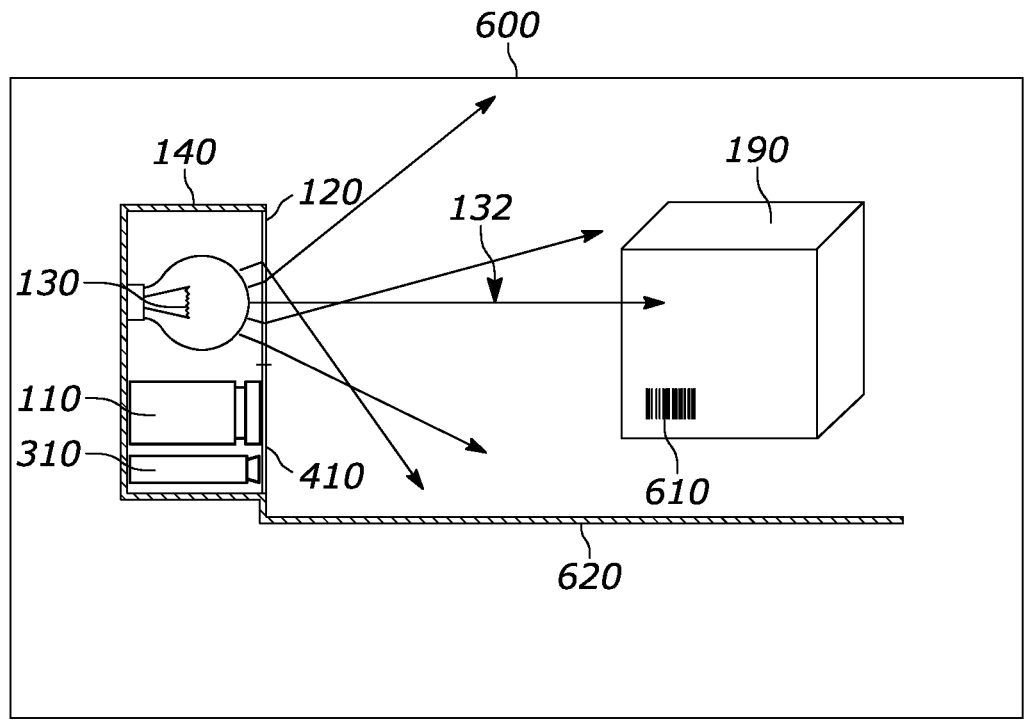
FIG. 6 illustrates an example indicia decoding device, according to example embodiments of the present disclosure.

FIG. 6 illustrates an example indicia decoding device 600, according to example embodiments of the present disclosure. The device 600 comprises an image capture device 110, and aiming assembly 310, a platter 620, and a window with a first portion that includes a material with switchable optical properties 120 (first portion 120) and a second portion that includes a material with switchable optical properties 410 (second portion 410). The window is positioned between a light source 130, the image capture device 110, and the aiming assembly 310 and a target 190 of the device 600. A housing 140 encloses the light source 130, the aiming assembly 310, and the image capture device 110. The device 600 is in the diffused lighting state, and a plurality of light rays 132 are emanating from the light source 130 through the window of first portion 120 and being refracted in various directions (see FIG. 2). The target 190 has an indicium 610 affixed to a surface of the target 190.

In this example scenario, when the target 190 is detected by the device 600, the device 600 attempts to locate and decode indicia affixed to a surface of the target 190. The device 600 may be configured to switch lighting states responsive to being unable to detect or decode indicia. For example, the device 600 may be configured to initially attempt to locate and decode indicia in a direct lighting state, and may be configured to switch to the diffused lighting state upon failing to detect or decode the indicium 610. The device 600 may alternatively be configured to initially attempt to locate and decode indicia in the diffused lighting state and switch to the direct lighting state responsive to a failed attempt to locate or decode the indicium 610. When the device switches lighting states and successfully decodes the indicium 610, the device 600 may be configured to return to an initial lighting state to search for additional indicia to decode. The device 600 may be configured to periodically alternate between lighting states when searching for indicia to decode.

The device 600 may be configured to select a lighting state responsive to the target 190 being highly specular (see FIG. 4). The device 600 may be configured to select a lighting state responsive to the indicium 610 having a low contrast. A selected lighting state for each of these scenarios may be direct or diffused, depending on particular requirements and characteristics of the device 600, the indicium 610, and the target 190.

The device 600 may be configured to switch to the diffused lighting state when the device 600 is in an indicia non-reading state. For example, when the device 600 cannot detect a target 190, the device 600 may be configured to switch to the diffused lighting state. In another example, the device 600 may have a sleep mode where the device 600 is not expected to read or decode indicia for a relatively extended period of time. In such a scenario, the device 600 may be configured to switch into the diffused lighting state for a duration of time spent in the sleep mode. The device 600 may be configured to switch into the diffused lighting state after a predetermined period of inactivity, automatically entering the sleep mode.

The indicium 610 may be any form of machine-readable indicia, including but not limited to a universal price code (UPC), a 1-dimensional barcode, a 2-dimensional barcode, text, other indicia, or combinations thereof. The indicium 610 may be applied to the surface of the target 190 by direct part marking (DPM). For example, the indicium 610 may be etched into the surface of the target 190, printed directly onto the surface of the target 190, directly applied to the surface of the target 190 in some other way, or combinations thereof. The indicium 610 may also be applied to the target 190 on a sticker or label.

Figure 7:
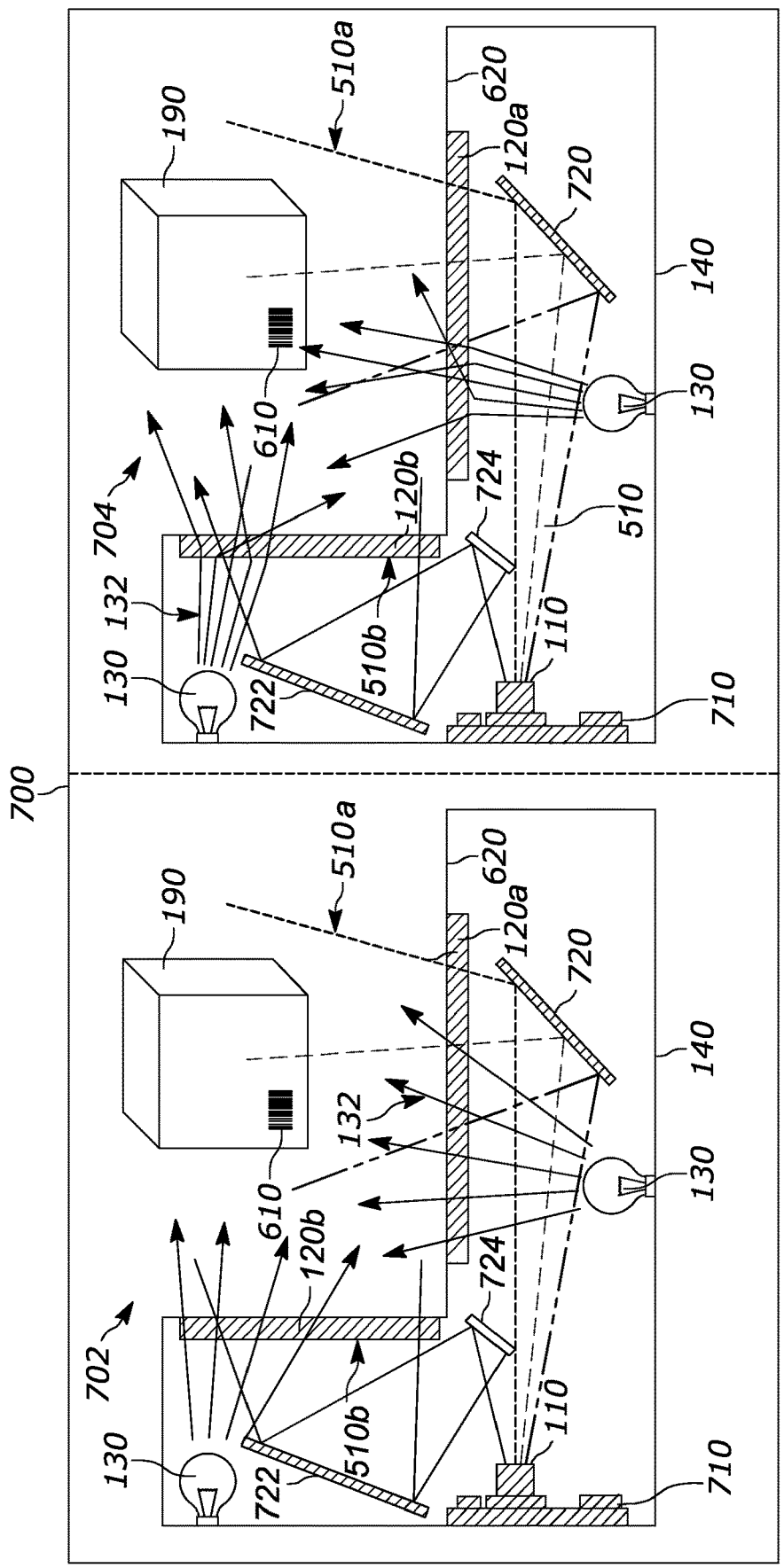
FIG. 7 illustrates an example indicia reader operating in a first reader state and a second reader state, according to example embodiments of the present disclosure.

FIG. 7 illustrates an example indicia reader 700 operating in a first reader state 702 and a second reader state 704, according to example embodiments of the present disclosure. The device 700 comprises an imaging assembly 110 with a primary field of view 510 (primary FOV 510), a platter 620, a controller 710, a first window that includes a material with switchable optical properties 120*a* (first window 120*a*), and a second window that includes a material with switchable optical properties 120*b* (second window 120*b*) (collectively, windows 120). The windows 120 are positioned between an illumination assembly 130 and a target 190 of the device 700. A housing 140 encloses the illumination assembly 130, the controller 710, and the imaging assembly 110. The device 700 is in the first reader state 702 to provide direct lighting in a left half of FIG. 7 and is in a second reader state 704 to provide diffused lighting in a right half of FIG. 7. A plurality of light rays 132 are emanating from the illumination assembly 130 through the windows 120 and in the diffused lighting state are being scattered in various directions (see FIG. 2). The target 190 has an indicium 610 affixed to a surface of the target 190.

A splitter mirror 724 divides the primary FOV 510 into a lower sub-field of view 510*a* (lower FOV 510*a*) and an upper sub-field of view 510*b* (upper FOV 510*b*). The lower FOV 510*a* is directed toward a first fold mirror 720 that redirects the lower FOV 510*a* generally upward through the first window 120*a* into a product scanning region. Separately, the upper FOV 510*b* is redirected by the splitter mirror 724 into an upper portion of the housing 140 where a second fold mirror 722 redirects the upper FOV 510*b* in a generally horizontal direction through the second window 120*b* and into the product scanning region. In this way, the imaging assembly 110 may view the target 190 from two different angles at once, increasing a likelihood that the indicium 610 will be visible. The lighting assembly 130 may be divided in two separate parts that are individually positioned to project light onto the target 190 as illustrated, or a single lighting assembly 130 may be provided adjacent to the imaging assembly 110 (i.e. mounted on a same printed circuit board) to provide an illumination path that closely follows that of the primary FOV 510, the lower FOV 510*a*, and the upper FOV 510*b*.

In this example scenario, the indicia reader 700 is alternately operable in one of the first reader state 702 or the second reader state 704. The indicia reader 700 may select an operable state of the first reader state 702 or the second reader state 704 based upon any criteria, including those discussed in FIG. 1, FIG. 2, FIG. 3, FIG. 4, FIG. 5, and FIG. 6. This selection may be determined by the controller 710. When the indicia reader 700 is in an indicia non-reading state, the indicia reader 700 may be configured to switch to the second reader state 704. The indicia reader 700 may also be configured to alternate between the first reader state 702 and the second reader state 704.

When the indicia reader 700 is operable in the first reader state, the imaging assembly 110 may be activated to capture image data of the target 190 over a first exposure period and the illumination assembly 130 may be activated with the windows 120 in a transparent state for at least some portion of the first exposure period. When the indicia reader 700 is operable in the second reader state 704, the imaging assembly 110 may be activated to capture image data of the target 190 over a second exposure period and the illumination assembly 130 may be activated with the windows 120 in a translucent state for at least some portion of the second exposure period.

The indicia reader 700 may be configured to modulate a length of the first exposure. For example, the indicia reader 700 may be configured to detect a saturation of an image captured by the imaging assembly 110 and reduce a subsequent first exposure time responsive to the detection. The indicia reader 700 may similarly be configured to modulate a length of the second exposure as needed.

Figure 8:
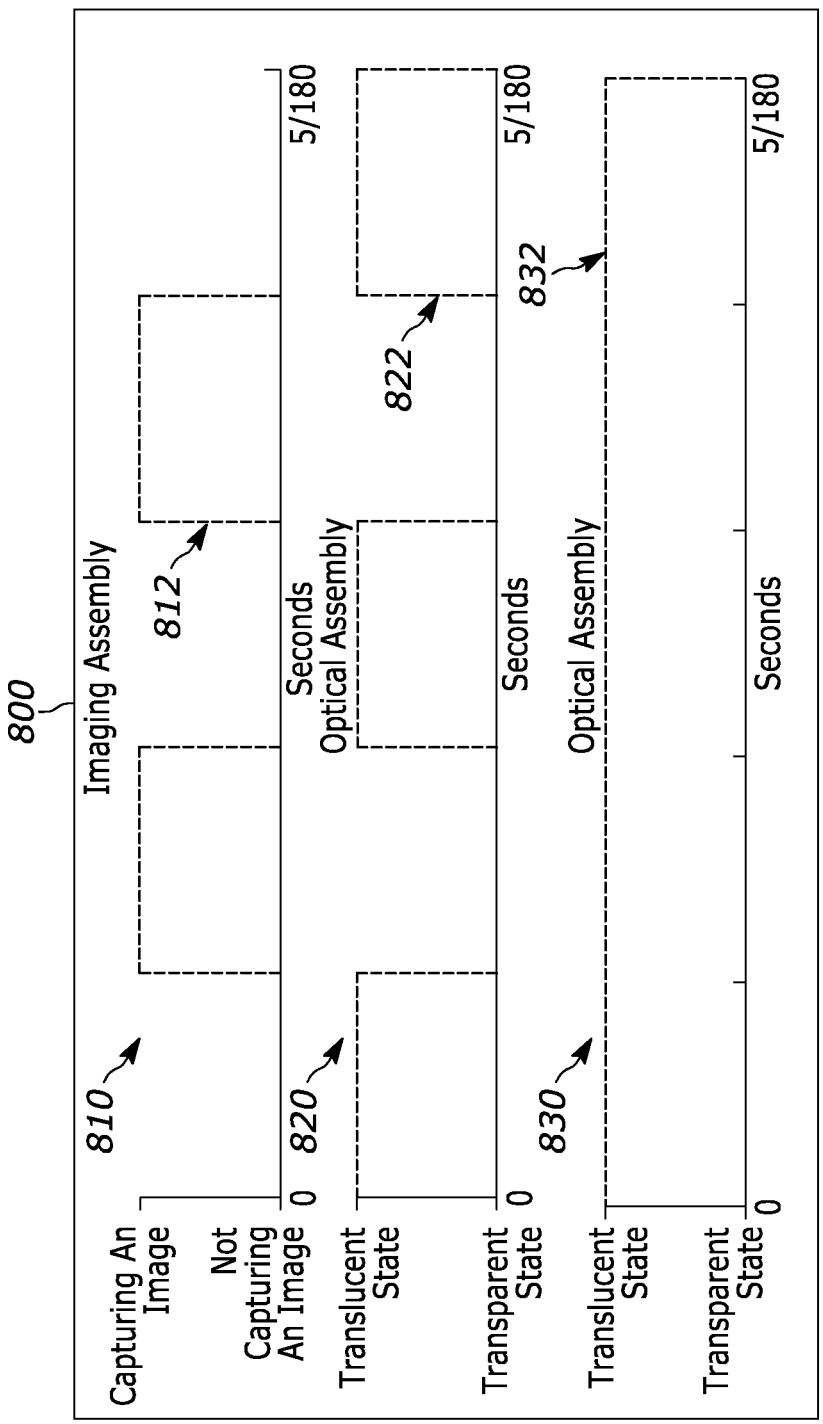
FIG. 8 illustrates a trio of timing diagrams for components of a machine vision system, according to example embodiments of the present disclosure.

FIG. 8 illustrates a trio 800 of timing diagrams for components of a machine vision system, according to example embodiments of the present disclosure. An upper timing diagram 810 illustrates example event timings for an imaging assembly, a middle timing diagram 820 illustrates example event timings for a switchable diffusion assembly operating in an oscillating mode, and a lower timing diagram 830 illustrates example event timings for a switchable diffusion assembly operating in a constant diffused mode. The trio 800 of timing diagrams illustrated herein may be applied to embodiments discussed in descriptions of previous figures as well as embodiments not explicitly discussed herein.

The upper timing diagram 810 illustrates events relating to the imaging assembly of the machine vision system. An image capture time 812 illustrates periods of time when the imaging assembly is capturing an image, and it will be noted that a frame rate of the imaging assembly as illustrated herein is 90 frames per second, though any frequency may be employed in various embodiments. It may be particularly desirable to implement a frame rate that is sufficient to replicate that of human vision, in which case a frame rate of 45 frames per second or greater may be required, though this is not a necessity and some embodiments will employ frame rates far below a perception threshold for human vision.

In some embodiments, the frame rate of the imaging assembly may be chosen such that images are captured in both direct and diffused lighting. For example, the frame rate of the imaging assembly may be doubled relative to what is illustrated in order to capture two images (one with direct lighting and the other with diffused lighting) for each cycle of the middle timing diagram 820. It should also be noted that while the image capture time 812 is illustrated as filling a full length of time in which lighting is direct, the image capture time 812 may be much shorter than the length of time in which lighting is direct. This may result in significantly differing relative lengths of the image capture time 812 and timings of the switchable diffusion assembly.

In some embodiments, a timing of the imaging assembly may be chosen to align with times when diffused lighting is provided (i.e. with a phase 180 degrees offset from what is illustrated). Such an arrangement may be desirable in situations where direct illumination is needed for a secondary purpose, such as but not limited to object detection, specular detection, or illuminating a target for a human user to be able to better see that target, but diffused illumination is needed for proper imaging of the target.

The middle timing diagram 820 illustrates events relating to the switchable diffusion assembly of the machine vision system. A translucent state time 822 illustrates periods of time in which the switchable diffusion assembly provides diffused lighting. During periods of time that are not the translucent state time 822, the switchable diffusion assembly may be operable in a transparent state to provide direct illumination of a target. The transparent state may be timed as illustrated to provide direct illumination of the target when the imaging assembly is capturing an image. In embodiments where the switchable diffusion assembly is positioned in between the imaging assembly and the target, the translucent state time 822 may be timed to provide the imaging assembly with a clear view of the target. In some example scenarios, the transparent state time and the translucent state time may be reversed. For example, the translucent state time 822 may be replaced with the transparent state time and a remainder of the time may be translucent state time.

In some embodiments, the frame rate of the imaging assembly may be high enough relative to a frequency of the switchable diffusion assembly's translucent state time 822 that the imaging assembly may capture images with direct illumination and images with diffused illumination in rapid succession. For example, the frame rate of the imaging assembly may be double the frequency of the switchable diffusion assembly's translucent state time 822, causing the imaging assembly to capture images with alternating direct lighting and diffused lighting.

The lower timing diagram 830 illustrates events relating to the imaging assembly of the machine vision system in another example. In this example, the machine vision system operates in a constant diffused state. Such a configuration may be desirable in scenarios where the machine vision system is capable of imaging while in the diffused state in order to avoid a potential strobing effect caused by rapid switching between states. A translucent state time 832 lasts for a complete duration of the lower timing diagram 830, and may extend before a start and after an end of the lower timing diagram 830 by a significant amount.

Figure 9:
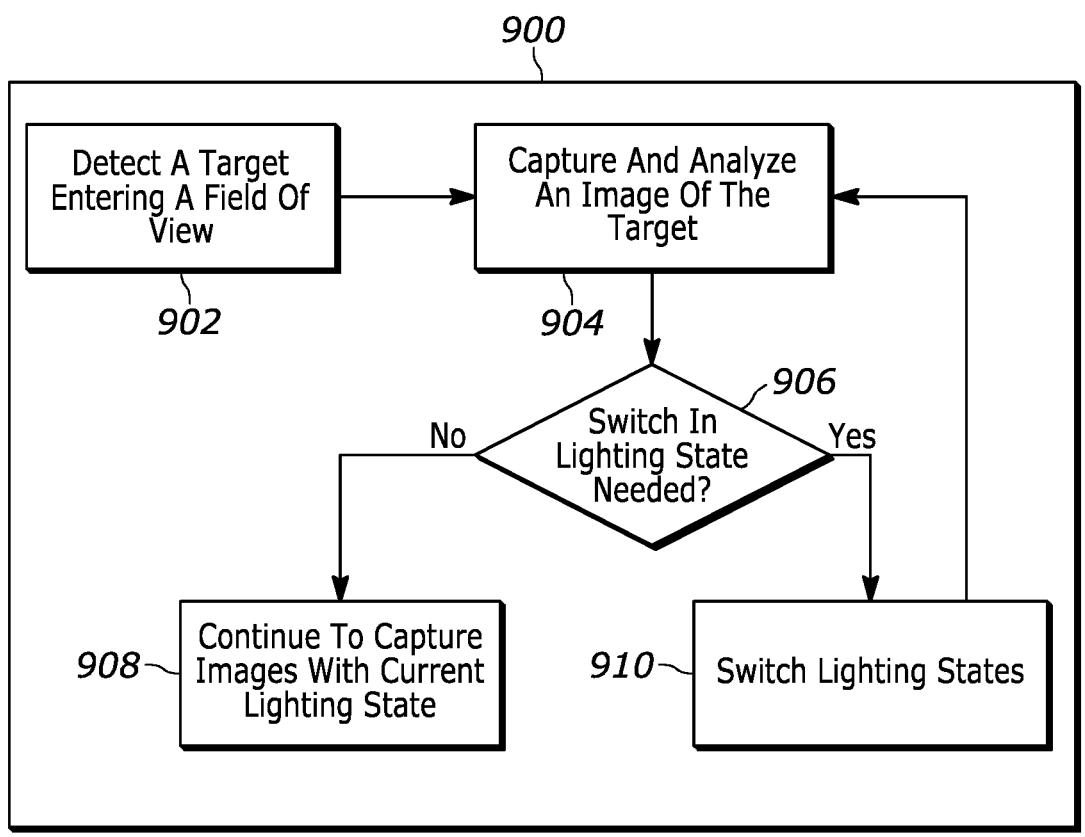
FIG. 9 illustrates a flowchart of an example method, according to example embodiments of the present disclosure.

FIG. 9 illustrates a flowchart of an example method 900, according to example embodiments of the present disclosure. It will be appreciated that the example method 900 is provided for illustrative purposes only with a high level of abstraction, and that actual embodiments of the present disclosure are likely to employ additional steps that are not described explicitly herein.

At block 902, an example system detects a target entering a field of view of an imaging assembly. The system may have multiple fields of view and multiple imaging assemblies, and it is not necessary for the target to enter all fields of view of the system. The system may be configured to wait in a sleep state until the system detects a target entering the field of view. In such a scenario, the system may be configured to provide diffused lighting of an environment prior to arriving at block 902. The system then proceeds to block 904.

At block 904, the system captures and analyzes an image of the target. The system may be configured to capture multiple images for analysis, and may do so with a range of different lighting states. For example, upon detecting the target entering the field of view at block 902, the system may be configured to automatically capture images of the target with direct lighting, 20% diffused lighting, 40% diffused lighting, 60% diffused lighting, 80% diffused lighting, and 100% diffused lighting for comparison. It will be appreciated that these percentages are for example purposes only, and that in practice the system may be configured to capture any number of images with any progression of lighting states.

The system then analyzes the image or images of the target to determine whether an image has been captured with a lighting state that is suitable for a particular application of the system. This analysis may involve comparing a plurality of images to determine which lighting state resulted in a highest quality image. The analysis may also involve measuring a saturation of an image or a portion of an image to determine whether the target is reflecting an excessive quantity of light back at the system. The system then proceeds to block 906.

At block 906, the system uses the analysis from block 904 to determine whether a change in lighting state is needed. In examples where the system has only captured a single image, this determination may be based upon measuring characteristics associated with image quality, such as but not limited to saturation of an image or saturation of a portion of an image. In examples where the system has captured multiple images, this determination may be responsive to a comparison of the multiple images resulting in a determination that an ideal lighting state is not a same lighting state as a current lighting state.

When the current lighting state is adequate, the system proceeds to block 908. When the current lighting state is inadequate, the system proceeds to block 910.

At block 908, the system may proceed with capturing additional images of the target for use with an application of the system. In some example scenarios, images which have already been captured may be sufficient for the application of the system, in which case the system may be configured to return to block 902 to search for a new target. The current lighting state may be maintained indefinitely, or after a period of time the system may be configured to switch into a sleep state wherein the lighting state is switched to provide diffused illumination.

At block 910, the system may be configured to switch lighting states responsive to a determination that the current lighting state is inadequate. In some example scenarios, an image captured by the system at block 904 may be sufficient for the system to perform the system's application without taking additional images, in which case the system may be configured to switch to a lighting state that is associated with that image. Alternatively in such a scenario, the system may be configured to return to block 902 without altering a current lighting state to search for a new target.

In example scenarios where an adequate image has not been captured with regard to lighting states or where additional images of the target need to be captured, the system may be configured to switch lighting states responsive to the analysis at block 904. The system may be configured to not switch lighting states if an inadequate image is a result of the target being in an improper position or orientation, such that the system may determine that switching lighting states is unlikely to remedy problems present in the image. The system may be configured to then return to block 904 to repeat image capture and analysis in a loop until an adequate lighting state is found. The system may be configured to try various lighting states in a predetermined order, or may choose a new lighting state predictively based upon the analysis at block 904. For example, responsive to an image at block 904 being too dark, the system may be configured to switch to a more direct lighting state for a subsequent loop of blocks 904 through 910.

Figure 10:
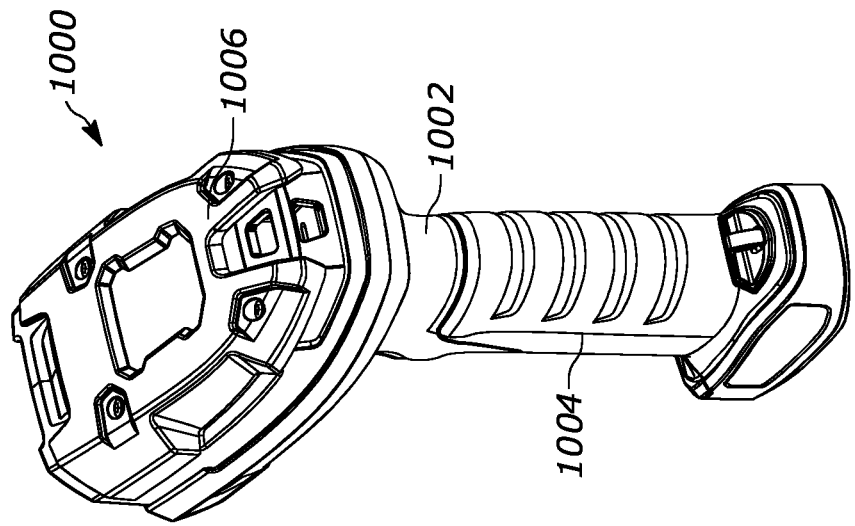
FIG. 10 illustrates an example barcode reader having a housing with a handle portion and a head portion, according to example embodiments of the present disclosure.
Figure 10:
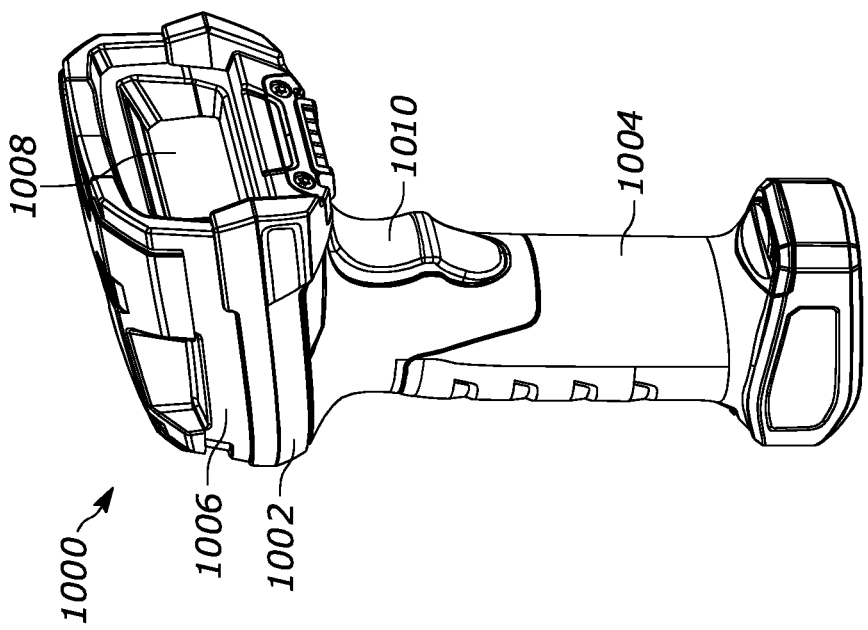

FIG. 10 illustrates an example barcode reader 1000 having a housing 1002 with a handle portion 1004 and a head portion 1006. The head portion 1006 includes a window 1008 and is configured to be positioned on the top of the handle portion 1004. The head portion 1006 includes an imaging lens (e.g., imaging lens 1144 as described with regard to FIG. 11 below) that, depending on the implementation, is and/or includes a variable focus optical element.

The handle portion 1004 is configured to be gripped by a reader user (not shown) and includes a trigger 1010 for activation by the user. Optionally included in an embodiment is a base portion (not shown), which may be attached to the handle portion 1004 opposite the head portion 1006 and is configured to stand on a surface and support the housing 1002 in a generally upright position. The barcode reader 1000 can be used in a hands-free mode as a stationary workstation when it is placed on a countertop or other workstation surface. The barcode reader 1000 can also be used in a handheld mode when it is picked up off the countertop or base station and held in an operator's hand. In the hands-free mode, products can be slid, swiped past, or presented to the window 1008 for the reader to initiate barcode reading operations. The barcode reader 1000 may include an illumination assembly located within the head portion 1006 and positioned to project light though the window 1008. The window 1008 may include a switchable material configured to be operable in either a direct lighting state or a diffused lighting state, wherein the switchable material is transparent or near-transparent in the direct lighting state to provide a clear path for light from the illumination assembly to exit the head portion 1006, and the switchable material is translucent in the diffused lighting state to scatter light from the illumination assembly as the light exits the head portion 1006. In the handheld mode, the barcode reader 1000 can be moved towards a barcode on a product, and the trigger 1010 can be manually depressed to initiate imaging of the barcode.

The direct lighting state or the diffused lighting state may be selected automatically by a controller, or a means of manually selecting the direct lighting state or the diffused lighting state may be provided. For example, a potentiometer wheel may be installed to a side of the handle portion 1004 that, when rotated, adjusts a degree of light diffusion of the illumination assembly. Any other control arrangement for the switchable material may be provided, however, including but not limited to buttons, touch sensors or sliding controls. A combination of manual and automatic control of lighting states may also be employed. For example, an automatic controller may attempt to select an appropriate lighting state for a particular situation, then a user may determine that a different state is required and adjust a manual control which overrides or adjusts outputs of the automatic controller.

Other implementations may provide only handheld or only hands-free configurations. In the embodiment of FIG. 10, the reader 1000 is ergonomically configured for a user's hand as a gun-shaped housing 1002, though other configurations may be utilized as understood by those of ordinary skill in the art. As shown, the lower handle 1004 extends below and rearwardly away from the body 1002 along a centroidal axis obliquely angled relative to a central FOV axis of a FOV of an imaging assembly within the scanning head 1002.

Figure 11:
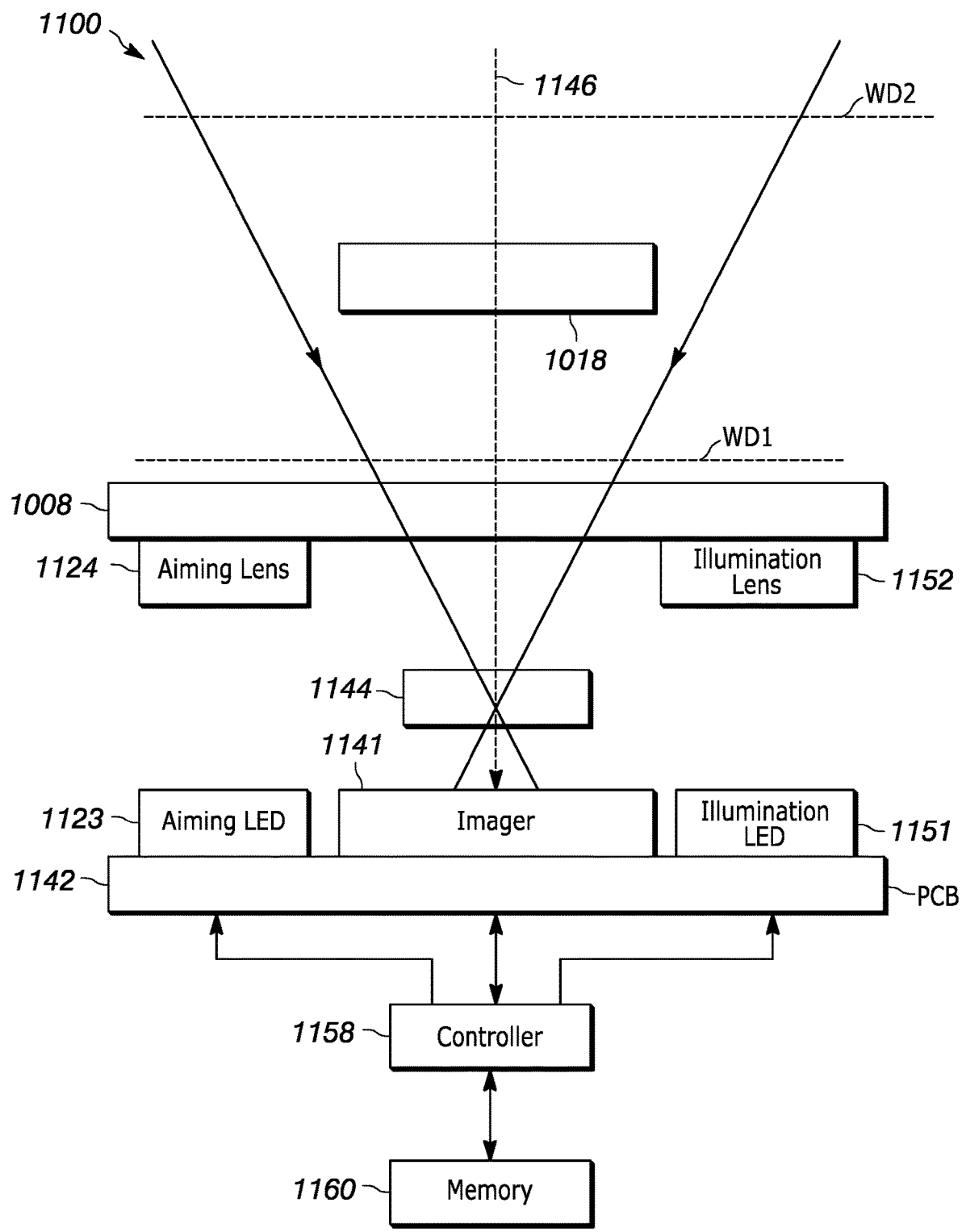
FIG. 11 illustrates a block diagram of an example architecture for an imaging device, according to example embodiments of the present disclosure.

FIG. 11 illustrates a block diagram of an example architecture for an imaging device such as handheld imaging device 1000. For at least some of the reader implementations, an imaging assembly 1145 includes a light-detecting sensor or imager 1141 operatively coupled to, or mounted on, a printed circuit board (PCB) 1142 in the imaging device 1100 as shown in FIG. 11. In an implementation, the imager 1141 is a solid-state device, for example, a CCD or a CMOS imager, having a one-dimensional array of addressable image sensors or pixels arranged in a single row, or a two-dimensional array of addressable image sensors or pixels arranged in mutually orthogonal rows and columns, and operative for detecting return light captured by an imaging assembly 1145 over a field of view along an imaging axis 1146 through a window 1108. The imager 1141 may also include and/or function as a monochrome sensor and, in further implementations, a color sensor. It should be understood that the terms "imager", "image sensor", and "imaging sensor" are used interchangeably herein. Depending on the implementation, imager 1141 may include a color sensor such as a vision camera in addition to and/or as an alternative to the monochrome sensor. In some implementations, the imager 1141 is or includes a barcode reading module (e.g., a monochromatic imaging sensor). In further implementations, the imager 1141 additionally or alternatively is or includes a vision camera (e.g., a color imaging sensor). It will be understood that, although imager 1141 is depicted in FIG. 11 as a single block, that imager 1141 may be multiple sensors spread out in different locations of imaging device 1100.

The return light is scattered and/or reflected from an object 1018 over the field of view. The imaging lens 1144 is operative for focusing the return light onto the array of image sensors to enable the object 1018 to be imaged. In particular, the light that impinges on the pixels is sensed and the output of those pixels produce image data that is associated with the environment that appears within the FOV (which can include the object 1018). This image data is typically processed by a controller (usually by being sent to a decoder) which identifies and decodes decodable indicia captured in the image data. Once the decode is performed successfully, the reader can signal a successful "read" of the object 1018 (e.g., a barcode). The object 1018 may be located anywhere in a working range of distances between a close-in working distance (WD1) and a far-out working distance (WD2). In an implementation, WD1 is about one-half inch from the window 1108, and WD2 is about thirty inches from the window 1108.

In some implementations, the imaging lens 1144 includes a variable focus optical element. In further implementations, the variable focus optical element is a lens operated and/or adjusted by a ball-bearing motor lens or a voice coil motor (VCM) actuator (i.e., a VCM lens). In implementations in which the variable focus optical element is a ball-bearing motor or VCM lens, the ball-bearing motor or VCM lens may have a focus range from 0.5 inches extending infinitely (i.e., to optical infinity). In further embodiments, the variable focus optical element may be any lens or optical element with a similar capability to adjust focus, such as a liquid lens, a T-lens, a ball-bearing focusing actuator and any other similar lens known in the art. Depending on the implementation, the controller 1158 may control the variable focus optical element.

An illuminating light assembly may also be mounted in, attached to, or associated with the imaging device 1100. The illuminating light assembly includes an illumination light source 1151, such as at least one light emitting diode (LED)

and at least one illumination lens 1152, and preferably a plurality of illumination and illumination lenses, configured to generate a substantially uniform distributed illumination pattern of illumination light on and along the object 1018 to be imaged by image capture. Although FIG. 11 illustrates a single illumination light source 1151, it will be understood that the illumination light source 1151 may include more light sources. At least part of the scattered and/or reflected return light is derived from the illumination pattern of light on and along the object 1018.

The window 1108 may include a switchable material configured to be operable in either a direct lighting state or a diffused lighting state, wherein the switchable material is transparent or near-transparent in the direct lighting state to allow the illumination light source 1151 to directly illuminate an object 1018 via the at least one illumination lens 1152, and translucent in the diffused lighting state to scatter light from the illumination light source 1151 as the light exits the at least one illumination lens 1152.

An aiming light assembly may also be mounted in, attached to, or associated with the imaging device 1100 and preferably includes an aiming light source 1123, e.g., one or more aiming LEDs or laser light sources, and an aiming lens 1124 for generating and directing a visible aiming light beam away from the imaging device 1100 onto the object 1018 in the direction of the FOV of the imager 1141.

Further, the imager 1141, the illumination source 1151, the switchable material of the window 1108, and the aiming source 1123 are operatively connected to a programmed microprocessor or controller 1158 operative for controlling the operation of these components. Depending on the implementation, the controller 1158 is, is part of, or includes the controller 1007 as described above with regard to FIG. 10. In some implementations, the controller 1158 is or includes an imaging processor as described herein. In further implementations, the controller 1158 functions as or is communicatively coupled to an imaging processor for receiving, processing, and/or analyzing the image data captured by the imagers.

A memory 1160 is connected and accessible to the controller 1158. Preferably, the controller 1158 is the same as the one used for processing the captured return light from the illuminated object 1018 to obtain data related to the object 1018. Though not shown, additional optical elements, such as collimators, lenses, apertures, compartment walls, etc. may be provided in the housing. Although FIG. 11 shows the imager 1141, the illumination source 1151, and the aiming source 1123 as being mounted on the same PCB 1142, it should be understood that different implementations of the imaging device 1100 may have these components each on a separate PCB, or in different combinations on separate PCBs. For example, in an implementation of the imaging device 1100, the illumination LED source is provided as an off-axis illumination (i.e., has a central illumination axis that is not parallel to the central FOV axis).

In some implementations, the object 1018 is or includes an indicia for decoding (e.g., a decode indicia), such as a barcode, a QR code, a label, a UPC code, a digital matrix code, etc. In further implementations, the object 1018 is or includes a digital watermark, the digital watermark may include a plurality of repeating barcodes, product codes, code patterns, or other such indicia that comprise the digital watermark. In some such implementations, the digital watermark is invisible or near-invisible to the human eye but is able to be detected and/or imaged by an imaging device 1100.

In some examples, at least one of the components is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein that may be appended hereto to illustrate the flow of those operations. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed systems and devices are defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

What is claimed:

1. A machine vision system, comprising:
   an image capture device;
   a material with switchable optical properties, wherein the material with switchable optical properties has a transparent state and a translucent state; and
   a light source, wherein the light source is positioned to illuminate a target of the image capture device, and the material with switchable optical properties is positioned between the light source and the target of the image capture device and configured to switch between the transparent state which is configured to provide direct illumination of the target and the translucent state which is configured to provide diffused illumination of the target,
   wherein the system is configured to change the state of the material with switchable optical properties responsive to a predetermined condition being met, and
   wherein the predetermined condition is a determination that at least one of a specularity of the target of the image capture device, a saturation of an image, or a saturation of a portion of an image exceeds a predetermined threshold.

2. The machine vision system of claim 1, further comprising a window that includes the material with switchable optical properties.

3. The machine vision system of claim 2, wherein the window is positioned between the image capture device and the target of the image capture device.

4. The machine vision system of claim 2, wherein the window is positioned between an aiming assembly and the target of the image capture device.

5. The machine vision system of claim 2, wherein only a portion of the window includes the material with switchable optical properties.

6. The machine vision system of claim 1, wherein the material with switchable optical properties contains at least one of an electrochromic material, a polymer dispersed liquid crystal material, and a suspended particle material.

7. The machine vision system of claim 1, wherein the system is configured to change the state of the material with switchable optical properties periodically at a predetermined frequency.

8. The machine vision system of claim 7, wherein the predetermined frequency is greater than 45 hertz.

9. The machine vision system of claim 7, wherein the predetermined frequency is configured to operate synchronously with an image capture frequency of the image capture device.

10. The machine vision system of claim 1, wherein the machine vision system is part of an indicia decoding device.

11. An indicia decoding device comprising:
    an image capture device;
    a material with switchable optical properties, wherein the material with switchable optical properties has a transparent state and a translucent state;
    an aiming assembly; and
    a light source, wherein the light source is positioned to illuminate a target of the image capture device, and the material with switchable optical properties is positioned between the light source and the target of the image capture device and configured to switch between the transparent state which is configured to provide direct illumination of the target and the translucent state which is configured to provide diffused illumination of the target, wherein the device is configured to change the state of the material with switchable optical properties responsive to a predetermined condition being met, and wherein the predetermined condition is a determination that at least one of a specularity of the target of the indicia decoding device, a saturation of an image, or a saturation of a portion of an image exceeds a predetermined threshold.

12. The indicia decoding device of claim 11, further comprising a window, and wherein the window includes the material with switchable optical properties.

13. The indicia decoding device of claim 12, wherein only a portion of the window includes the material with switchable optical properties.

* * * * *